INVENTORS
RICHARD ARTHUR GRUENTZEL
PETER D. HARRIS
ATTORNEY 3,485,437
TEAR RESISTANT ARTICLE
Richard A. Gruentzel, Appleton, and Peter D. Harris, Menasha, Wis.; said Gruentzel assignor to American Can Company, New York, N.Y., a corporation of New Jersey
Continuation-in-part of application Ser. No. 650,352, June 30, 1967. This application Feb. 5, 1968, Ser. No. 702,957
Int. Cl. B65d 31/10, 33/16, 33/00
U.S. Cl. 229—53
6 Claims

ABSTRACT OF THE DISCLOSURE

A tear resistant article, such as a bag, made from plastic film wherein propagation of a tear in a first weakened area, such as a heat welded seam is averted. A second weakened area is deliberately provided substantially normal or at other orientations to the first weakened area. The second weakened area intersects the first weakened area at a point closely adjacent but longitudinally spaced from a point on the first weakened area where the inception of a tear is likely to occur. This construction not only distributes the rupture causing forces over a wider area but also directs propagation of the line of failure away from the first weakened area.

---

This application is a continuation-in-part of application, Ser. No. 650,352, filed June 30, 1967, now abandoned.

This invention relates to methods of making tear resistant articles of films of plastic material and to products, embodying such tear resistant film.

The tear resistance is imparted to the articles by forming in the film at selected points of relative weakness where a film failure could initiate, such as points along a heat welded seam, means such as an aperture, score line or slit for redistributing rupture causing stress forces over a wider area of the film than previously possible, and for guiding any resulting rupture away from the weakened areas of the film to other stronger parts of the film. In particular, the invention has been successfully applied to the heat welded side seams of bread bags constructed of polymeric plastic material to eliminate the complete destruction of the side seams when the bag is being filled with product.

BACKGROUND AND FIELD OF INVENTION

The invention pertains to the fields of joining plastic films by seaming, of plastic bag making, and of plastic bag filling.

It is old in the art to join films of plastic material together by forming bonding seams as one of the steps in the construction of new articles from such films. For example, bread bags for use in packaging of fresh bread products are commonly constructed in this manner. It is known that the seams often represent the weakest areas of such articles, and that stress applied to such articles transversely of the seams causes such seam areas to rupture in response to a much lower force than is required to rupture unseamed areas. Such a rupture, if unchecked, can propagate throughout the entire length of the seam.

The prior art has faced the problem of preventing the tearing of seamed or unseamed sheet material by strengthening the material at potential weak points, and by totally removing areas of potential high stress which could represent rupture initiation points. Pope, in U.S. Patent No. 194,170 shows both of these approaches.

Potdevin et al., in U.S. Patent No. 2,085,766, cut away the folded corners at the mouth of a collapsed bag made of brittle plastic film material to eliminate cracks in a potentially weak area.

BRIEF DESCRIPTION OF THE INVENTION

Articles of manufacture such as bags made of film of a plastic material may contain weakened areas in the form of creases, wrinkles, thin spots or heat welded side seams which are likely to fail by tearing or rupturing in response to lower stress forces than are required to cause other parts of the film to fail. It has been discovered that such failure can be prevented or substantially inhibited by further weakening in the manner to be described, the area of the film in which such failure is likely to initiate.

It has been found that catastrophic failure of a first weakened area may be prevented by providing a second weakened area which intersects the first weakened area so as to be substantially normal thereto at a location closely adjacent but longitudinally spaced from the point at which failure is most likely to initiate. This construction permits a small portion of the first weakened area to fail between the points at which the inception of the tear is most likely to occur and the intersection of the second weakened area with the first weakened area. Thereafter, the line of propagation of the tear is directed by the second weakened area away from the first weakened area.

Figure 1:
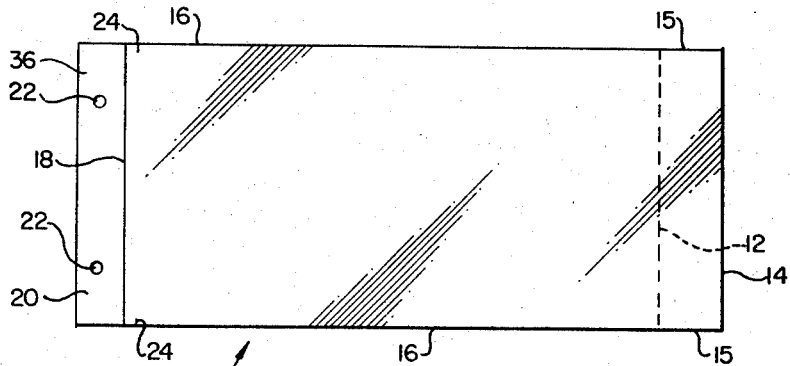
FIG. 1 is a top plan view of a bag, constructed of film of a plastic material, which embodies one form of the invention.

FIG. 1 shows a bag 10 constructed from film of plastic material in a manner well known in the bread packaging industry as shown for example in Knuetter 2,283,-069. A predetermined length of plastic film 36, slightly longer than twice the length of bag 10 has been folded over upon itself to form two walls and the bottom 14 of bag 10. A conventional W-fold 12, when viewed in cross section, has been provided at the bottom and a flap 20 at the top of bag 10. Flap 20 contains holes 22 which permit bag 10 to be suspended in an automatic filling device. The side edges 16 of film 36 have been heat welded together all the way to the bottom of bag 10 to close its sides and form triangular bottom corners 15. The bag opening is formed between film edge 18 and flap 20.

Figure 2:
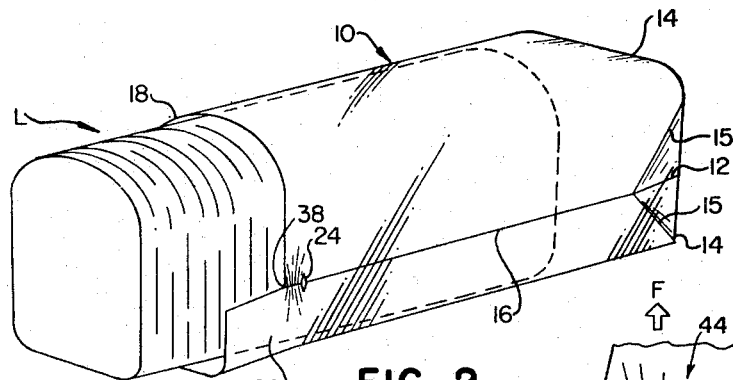
FIG. 2 is a perspective of the bag of FIG. 1 opened for the purpose of being filled with product.

FIG. 2 shows bag 10 opened for the receipt of a loaf of bread L. During the automatic or hand opening and filling of bag 10, stress forces F (FIG. 3) operate on the mouth of the bag to maintain it in an open position. The forces F, generated in opening the bag by hand or by filling machinery and by the loaf L itself if it is overproofed (oversized), are concentrated by the shape of the bag at point 38, the intersection of heat welded side seam 16 and the bag opening. The bag is likely to tear at this point and because of the weakness of the seam area, the tear frequently propagates all along seam 16.

The explanation of why the bag tears along the side seam is thought to be as follows: When the side weld is formed by a hot knife the film immediately adjacent to the seam is caused to increase in crystallinity. The increase in crystallinity results in a reduction of tensile strength in this area. Thus, even if a flawless heat welded seam is produced, the seam area is weaker than unwelded areas of the film.

Figure 3:
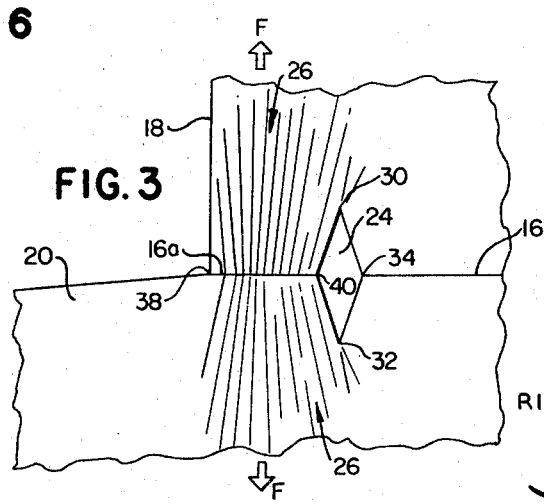
FIG. 3 is an enlargement of the portion of the bag of FIGS. 1 and 2 located at the intersection of the mouth of the bag and one of the bag's heat welded side seams showing one form of the invention.
Figure 4:
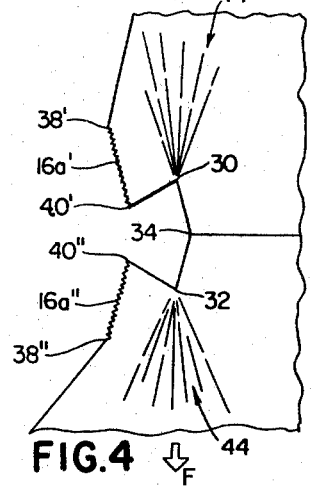
FIG. 4 shows the same portion of the bag as does FIG. 3 after a limited initial failure of one of the bag's heat welded side seams.

The improvement of the present invention is illustrated in FIGS. 3 and 4 in greater detail. In bags of the prior art, stress forces F are concentrated at the intersection 38 of the bag opening and the relatively weakened area of the heat welded side seam. Because of the thin cross section of the film at the weld, even small magnitudes of the forces F can exceed the tensile strength of the seam.

In accordance with the present invention, a second weakened area is provided on opposite sides of the bag at 24. It will be observed that the second weakened area is substantially normal to the side seams 16 and closely adjacent but longitudinally spaced from point 38. It is at point 38 where the inception of the tear is likely to occur. This second weakened area 24 thereby defines a portion 16a of the side seam 16 between point 38 and the intersection of weakened area 24 with side seam 16 which will fail initially. The propagation of the line of tear is directed by the second weakened area 24 away from side seam 16 as to avert a catastrophic side seam failure. Weakened area 24 may be a score line of a depth insufficient to penetrate the film at seam 16, or it may be a slit which does completely penetrate the film at seam 16. In FIGS. 2, 3 and 4, the weakened area 24 is shown in stretched and extended position.

The provision of the weakened area 24 enables the stress forces F to be distributed over a wider area of seam 16 than previously possible, and in the event of seam rupture, to direct the propagation of the line of tear away from seam 16. This can be seen in FIGS. 3 and 4. The provision of slit 24 permits the area of film between slit 24 and the bag opening to move somewhat free of the area of film between slit 24 and the bottom of the bag.

Thus, forces F are not concentrated solely at point 38 but are distributed over the entire length 16a of the seam between point 38 and the point 40 at which the seam 16a intersects slit 24. Visible evidence of this force distribution is the formation of wrinkles 26 which are observed to form and radiate from the entire length of seam 16a upon the application of forces F to the bag opening. Virtually, no wrinkles are observed to form between slit 24 and the bottom of the bag.

FIG. 4 illustrates what happens when forces F have been increased to the point of causing seam 16a to tear apart forming edges 16a' and 16a" bordered by points 38', 38" and 40', 40" respectively.

A unique feature is that the forces F are then directed away from the new potential initiation point 34 of a possible tear along seam 16, to the end corners 30 and 32 of slit 24. Formation of wrinkles 44 at points 30 and 32 and not at point 34 bears this out. It should be noted that points 30 and 32 are located in an unwelded area of the film and the film at those points is stronger than the film at point 34.

It is an important feature that the weakened area 24, whether it be a perforated slit, an unperforated slit, or notch, be such that terminal points corresponding to 30 and 32 be formed so that the line of propagation of the tear along 16a be directed away from seam 16.

The plastic film can be of any composition common to the bag making art, such as polyethylene, polypropylene, copolymers of polyethylene and polypropylene, and other well known plastic film forming materials.

In one experiment a bag for use in the packaging of bread was produced from polypropylene film and heat welded along seam 16. The collapsed bag was 8¾ inches wide, 20¼ inches long including a 1½ inch flap and contained one slit in each seam 16 which proceeded from the bag edge ¼ inch across the bag width, and which was located ⅜ of an inch as measured along seam 16 from the intersection of the bag opening with seam 16. Such a slit was found to successfully prevent and inhibit seam failure during bag filling.

Figure 5:
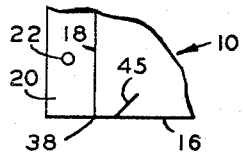
FIG. 5 is a fragmentary view of a bag corresponding to the bag of FIG. 1 which embodies a modified form of the invention.

A modified form of the present invention is illustrated in FIG. 5 wherein the bag 10 corresponds to the bag of FIGS. 1–4 as indicated by the same reference numerals. The weakened area 45 is in the form of a slit through the walls of the bag at each seam 16. Preferably, the weakened area 45 extends into the bag wall at an oblique angle with respect to the side seam 16. The weakened area 45, for example, may enter the side seam 16 approximately one-quarter inch (¼") below point 38 and extend at an angle of 45° for a distance of approximately one-quarter inch (¼") into the bag wall.

Figure 6:
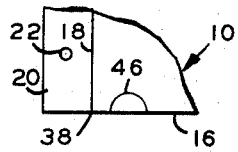
FIG. 6 is another fragmentary view of a bag corresponding to the bag of FIG. 1 which embodies a further modification of the present invention.

Another modified form of the present invention is illustrated in FIG. 6 where the bag 10 corresponds to the bag of FIGS. 1–4 as indicated by the use of the same reference numerals. The weakened area 46 is in the form of a semicircular score or impression which preferably is not punched through the bag wall and may be approximately one-quarter inch (¼") in diameter. If desired, the weakened area may be a semicircular punch-out in which case, the diameter of the punch-out may be equal to one-half inch (½").

The invention may also be used to inhibit or prevent film tearing at weakened areas other than those caused by heat welding, such as those caused by repeated film creasing or by thin spots in the film as originally manufactured.

It is thought that the invention will be clearly understood from the foregoing description and it is obvious that changes may be made in the form, construction and arrangement without departing from the spirit and scope of the invention.

We claim:

1. A bag fabricated from plastic film material comprising first and second wall panels joined to each other along a portion of their marginal edges by means of a heat welded seam to form a bag with an opening, the heat welded seam including a first weakened area located at an intersection between said seam and the bag opening, said first weakened area being likely to fail in response to a lesser tensional force than other areas of the bag, a second weakened area intersecting said heat welded seam, the second weakened area being located in spaced relation from the intersection of the bag opening and the heat welded seam to confine the first weakened area, said second weakened area including means for redirecting tensile forces away from the first weakened area into said other areas of the bag so that a failure occurring along said first weakened area in response to a given excess tensional force is prevented from further propagation into the heat welded seam as the second weakened area redirects the failure forces away from said first area.

2. A bag as defined by claim 1 wherein the walls of the bag are joined by a fold line at the bottom end of the bag, wherein the longitudinal side edges of the wall panels are heat welded together, and wherein both of said heat welded side edges are provided with second weakened areas.

3. The article as defined in claim 1 wherein said second weakened area includes a score line of a depth insufficient to penetrate said film.

4. The article as defined in claim 1 wherein said second weakened area includes a slit which completely penetrates said film.

5. The article as defined in claim 2 wherein the second weakened area includes a slit which extends at an oblique angle with respect to the longitudinal seam.

6. The article as defined in claim 2 wherein the second weakened area includes a semicircular impression adjacent said longitudinal seam.

References Cited

UNITED STATES PATENTS

| | | | |
|---|---|---|---|
| 2,099,425 | 11/1937 | Goodman | 229—66 |
| 3,142,437 | 7/1964 | Grant et al. | 229—53 X |
| 3,186,628 | 6/1965 | Rohde | 229—66 |
| 3,372,857 | 3/1968 | Brayla | 229—53 |
| 3,375,969 | 4/1968 | Davis | 229—66 X |
| 2,138,119 | 11/1938 | Potdevin et al. | 229—53 |
| 3,045,891 | 7/1962 | Alvarez | 229—69 |

DAVID M. BOCKENEK, Primary Examiner

U.S. Cl. X.R.

229—62, 66